US012682445B2

(12) United States Patent
Cozza

(10) Patent No.: US 12,682,445 B2
(45) Date of Patent: Jul. 14, 2026

(54) SYSTEM AND METHOD FOR DETECTING WORN, DAMAGED, OR MISSING AGRICULTURAL IMPLEMENT COMPONENTS USING A UAV

(71) Applicant: CNH Industrial America LLC, New Holland, PA (US)

(72) Inventor: Michael R. Cozza, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 224 days.

(21) Appl. No.: 18/225,866

(22) Filed: Jul. 25, 2023

(65) Prior Publication Data

US 2025/0037265 A1 Jan. 30, 2025

(51) Int. Cl.
*G06T 7/00* (2017.01)
*A01B 63/02* (2006.01)
(Continued)

(52) U.S. Cl.
CPC ............ *G06T 7/0008* (2013.01); *A01B 63/02* (2013.01); *B64U 50/13* (2023.01); *G05D 1/101* (2013.01);
(Continued)

(58) Field of Classification Search
CPC ......... G06T 7/0008; G06T 2207/10032; G06T 2207/30252; A01B 63/02; A01B 79/005;
(Continued)

(56) References Cited

U.S. PATENT DOCUMENTS 6,778,894 B2 8/2004 Beck et al.
7,266,420 B2 9/2007 Budd
(Continued)

FOREIGN PATENT DOCUMENTS

CN 109005997 * 12/2018 ............. A01G 3/088
DE 102016202627 8/2017
(Continued)

OTHER PUBLICATIONS

Yunpeng Wu et al. "A UAV-Based Visual Inspection Method for Rail Surface Defects" Article Applied Sciences Jun. 24, 2018 (20 pages) https://www.mdpi.com/2076-3417/8/7/1028.

*Primary Examiner* — Jerome Grant, II
(74) *Attorney, Agent, or Firm* — Dority & Manning, P.A.

(57) ABSTRACT
A system for detecting worn, damaged, or missing agricultural implement components includes an unmanned aerial vehicle (UAV) configured to fly relative to an agricultural implement. The UAV includes a propulsion system configured to provide propulsive power to the UAV and a component status sensor mounted to the UAV and configured to generate data indicative of a status of one or more components of the agricultural implement. The system also includes a computing system communicatively coupled to the propulsion system and the component status sensor and configured to monitor the status of the component(s) of the agricultural implement based on the data generated by the component status sensor. Additionally, the computing system is configured to determine when the component(s) of the agricultural implement is worn, damaged, or missing based on the monitored status of the component(s).

17 Claims, 5 Drawing Sheets

(51) Int. Cl.

| | |
|---|---|
| *B64U 50/13* | (2023.01) |
| *G05D 1/00* | (2006.01) |
| *B64U 101/26* | (2023.01) |
| *B64U 101/30* | (2023.01) |
| *B64U 101/40* | (2023.01) |

(52) U.S. Cl.

CPC ...... *B64U 2101/26* (2023.01); *B64U 2101/30* (2023.01); *B64U 2101/40* (2023.01); *G06T 2207/10032* (2013.01); *G06T 2207/30252* (2013.01)

(58) Field of Classification Search

CPC ............... B64U 50/13; B64U 2101/26; B64U 2101/30; B64U 2101/40; G05D 1/101

USPC ....................................................... 382/141

See application file for complete search history.

(56) References Cited

U.S. PATENT DOCUMENTS

| | | | |
|---|---|---|---|
| 8,909,389 | B2 | 12/2014 | Meyer |
| 9,513,635 | B1 | 12/2016 | Bethke et al. |
| 10,083,616 | B2 | 9/2018 | Bauer et al. |
| 10,223,753 | B1 | 3/2019 | Marlow et al. |
| 10,303,172 | B2 | 5/2019 | Hwang et al. |
| 2012/0300059 | A1 | 11/2012 | Stege |
| 2016/0236638 | A1 | 8/2016 | Lavie et al. |
| 2018/0196438 | A1 | 7/2018 | Newlin et al. |
| 2018/0305901 | A1 | 10/2018 | Carpenter et al. |

FOREIGN PATENT DOCUMENTS

| | | | |
|---|---|---|---|
| EP | 3414982 | A1 | 12/2018 |
| IN | 202322023686 | * | 3/2023 |
| KR | 102288079 | * | 8/2021 |

* cited by examiner

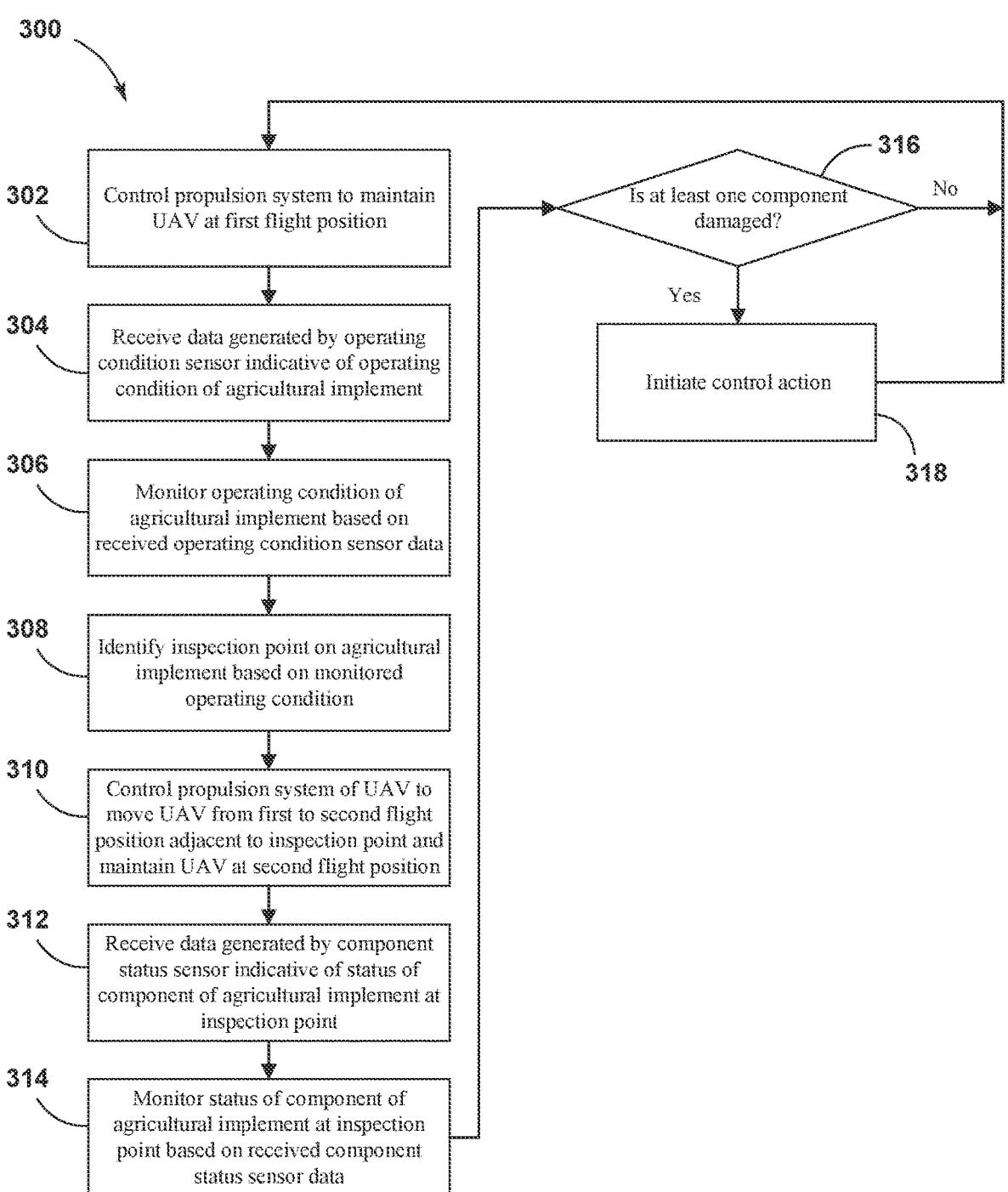

300

302 — Control propulsion system to maintain UAV at first flight position

304 — Receive data generated by operating condition sensor indicative of operating condition of agricultural implement 306 — Monitor operating condition of agricultural implement based on received operating condition sensor data 308 — Identify inspection point on agricultural implement based on monitored operating condition 310 — Control propulsion system of UAV to move UAV from first to second flight position adjacent to inspection point and maintain UAV at second flight position 312 — Receive data generated by component status sensor indicative of status of component of agricultural implement at inspection point 314 — Monitor status of component of agricultural implement at inspection point based on received component status sensor data 316 — Is at least one component damaged?

No

Yes

318 — Initiate control action

FIG. 4

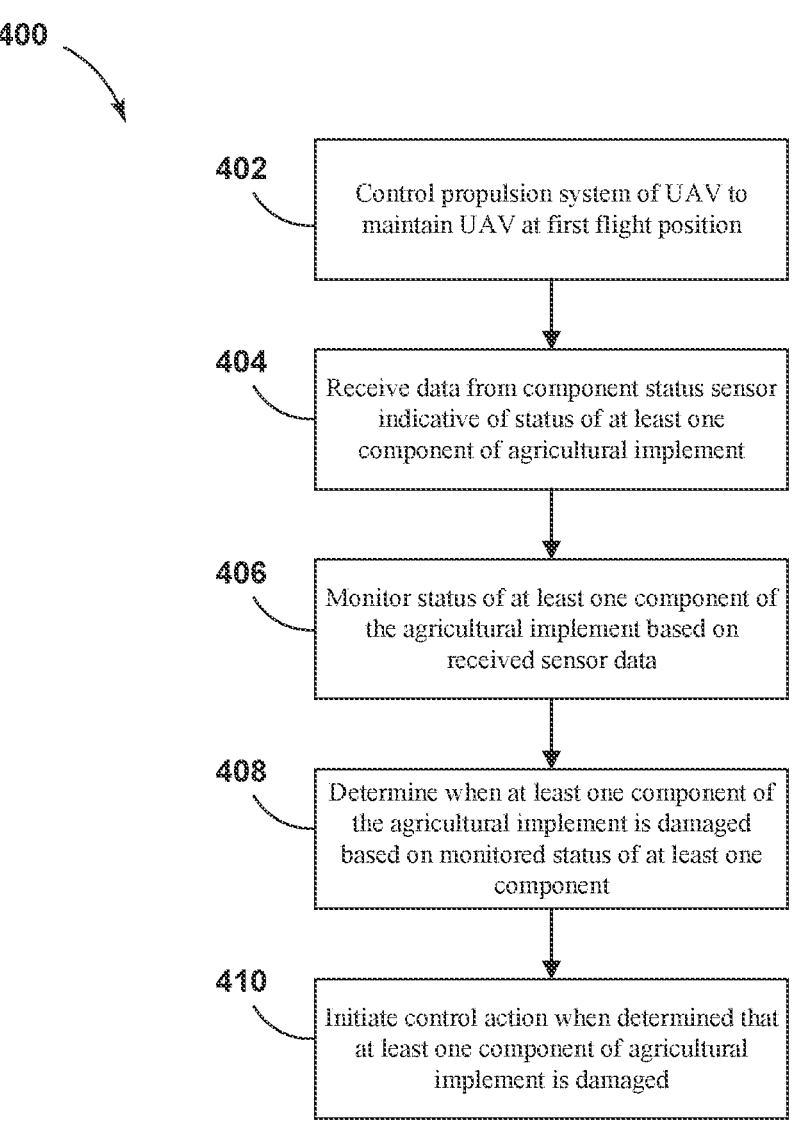

400

402
Control propulsion system of UAV to maintain UAV at first flight position

404
Receive data from component status sensor indicative of status of at least one component of agricultural implement 406
Monitor status of at least one component of the agricultural implement based on received sensor data 408
Determine when at least one component of the agricultural implement is damaged based on monitored status of at least one component 410
Initiate control action when determined that at least one component of agricultural implement is damaged

FIG. 5

SYSTEM AND METHOD FOR DETECTING WORN, DAMAGED, OR MISSING AGRICULTURAL IMPLEMENT COMPONENTS USING A UAV

FIELD OF THE INVENTION

The present disclosure generally relates to agricultural implements, such as tillage implements, and, more particularly, to systems and methods for detecting worn, damaged, and/or missing agricultural implement components using an unmanned aerial vehicle (UAV).

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural vehicle, such as a tractor. Tillage implements typically include one or more components, such as ground-engaging components configured to rotate relative to the soil as the implement is moved across the field. Such rotating ground engaging component(s) loosen and/or otherwise agitate the soil to prepare the field for subsequent planting operations.

During a tillage operation, these components often become worn, damaged, and/or missing. For example, such components include one or more harrow discs, leveling discs, rolling baskets, and/or the like. To ensure proper operation of the tillage implement, sensors are often mounted on the tillage implement and/or the agricultural vehicle to generate data indicative of wear, damage, or absence of implement components associated with certain inspection points of the tillage implement. However, such sensors are prone to damage from dirt and other debris due to the sensor proximity to the field surface and thus affect inspection of the worn, damaged, and/or missing components.

Accordingly, an improved system and method for detecting worn, damaged, and/or missing agricultural implement components would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting worn, damaged, or missing agricultural implement components. The system includes an unmanned aerial vehicle (UAV) configured to fly relative to an agricultural implement. The UAV includes a propulsion system configured to provide propulsive power to the UAV and a component status sensor mounted to the UAV and configured to generate data indicative of a status of at least one component of the agricultural implement. Additionally, the system includes a computing system communicatively coupled to the propulsion system and the component status sensor. The computing system is configured to monitor the status of the at least one component of the agricultural implement based on the data generated by the component status sensor. Furthermore, the computing system is configured to determine when the at least one component of the agricultural implement is worn, damaged, or missing based on the monitored status of the at least one component.

In another aspect, the present subject matter is directed to a method for detecting worn, damaged, or missing agricultural implement components. The method includes controlling, with a computing system, a propulsion system of an unmanned aerial vehicle (UAV) to fly the UAV relative to an agricultural implement. Moreover, the method includes receiving, with the computing system, data from a component status sensor supported on the UAV indicative of a status of at least one component of the agricultural implement. Additionally, the method includes monitoring, with the computing system, the status of the at least one component of the agricultural implement based on the received component status sensor data. Furthermore, the method includes determining, with the computing system, when the at least one component of the agricultural implement is worn, damaged, or missing based on the monitored status of the at least one component. Moreover, the method includes initiating, with the computing system, a control action when it is determined that the at least one component of the agricultural implement is worn, damaged, or missing.

In a further aspect, the present subject matter is directed to an unmanned aerial vehicle (UAV). The UAV includes a frame, a propulsion system supported by the frame and configured to provide propulsive power to the UAV, and a component status sensor supported by the frame and configured to generate data indicative of a status of at least one component of the agricultural implement. Furthermore, the UAV includes a computing system communicatively coupled to the propulsion system and the component status sensor. The computing system is configured to monitor the status of the at least one component of the agricultural implement based on the data generated by the component status sensor. Furthermore, the computing system is configured to determine when the at least one component of the agricultural implement is worn, damaged, or missing based on the monitored status of the at least one component.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates a flow diagram providing one embodiment of example control logic for detecting worn, damaged, or missing agricultural implement components in accordance with aspects of the present subject matter; and FIG. 5 illustrates a flow diagram of one embodiment of a method for detecting worn, damaged, or missing agricultural implement components in accordance with aspects of the present subject matter.

Figure 1:
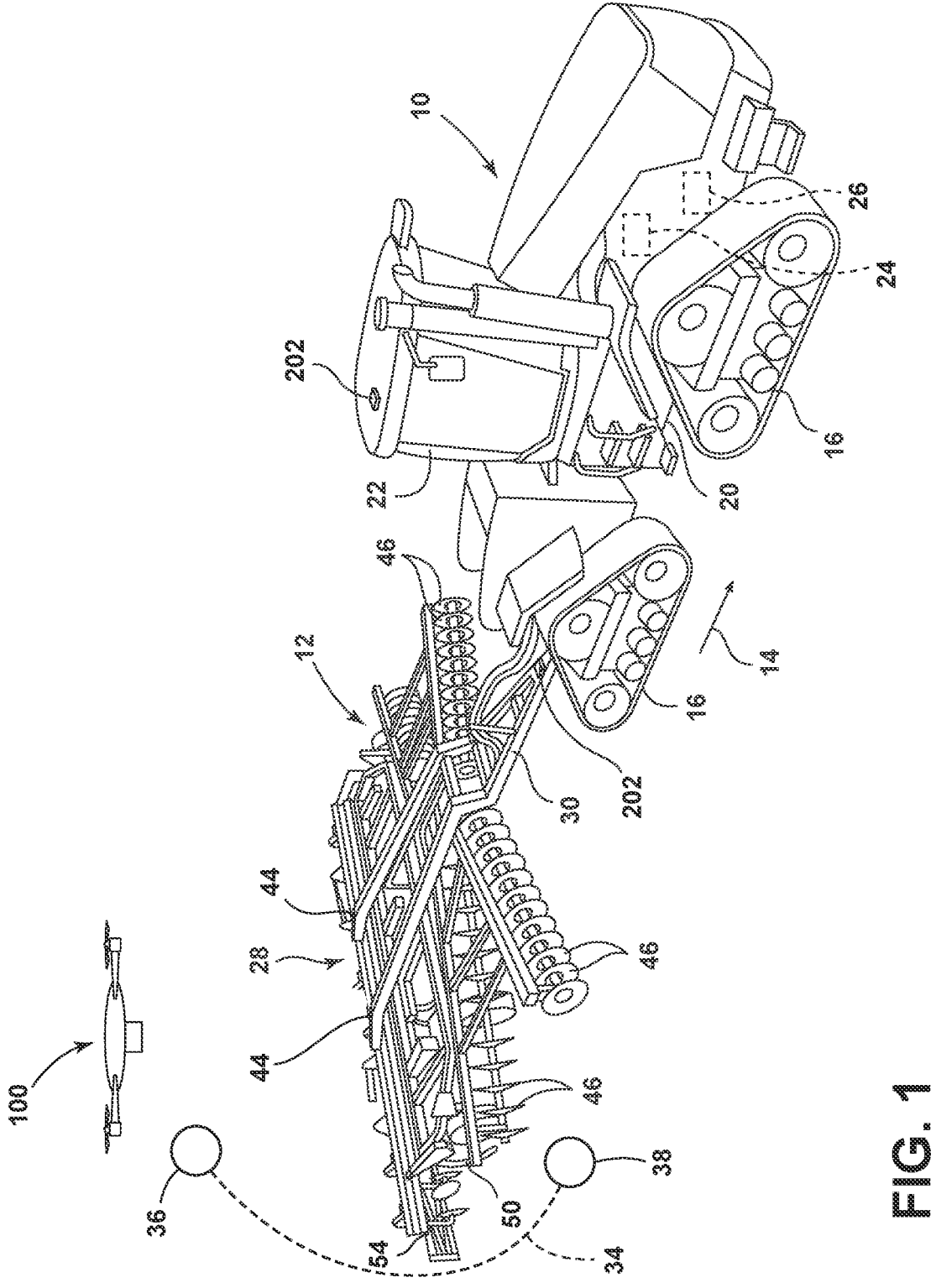
FIG. 1 illustrates a perspective view of one embodiment of an agricultural implement and an associated agricultural vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for detecting one or more damaged components of an agricultural implement. Specifically, the disclosed system includes an unmanned aerial vehicle (UAV) configured to fly relative to an agricultural implement. The UAV, in turn, includes a component status sensor and an operating condition sensor supported thereon. In this respect, as the UAV flies relative to the agricultural implement, the operating condition sensor is configured to generate data indicative of one or more operating conditions of the agricultural implement. For example, in one embodiment, the operating condition(s) may be a plugged condition of one or more ground-engaging tools (e.g., disk blades, shanks, etc.) of the agricultural implement. Furthermore, as the UAV flies relative to the agricultural implement, the component status sensor is configured to generate data indicative of the status of the component(s) of the agricultural implement. For example, in one embodiment, the status may be, such as whether the ground-engaging tool(s) of the agricultural implement are worn, damaged or missing.

In several embodiments, a computing system of the disclosed system is configured to monitor the operating condition of the agricultural implement based on the data generated by the operating condition sensor. Thereafter, the computing system is configured to identify an inspection point, which is adjacent to a flight position to which the UAV may be moved and maintained at, on the agricultural implement based on the monitored operating condition. Thereafter, the computing system is configured to control a propulsion system of the UAV to move the UAV to the flight position adjacent to the inspection point and then monitor the status of the component(s) of the agricultural implement at the inspection point based on the data generated by the component status sensor. The computing system is then configured to determine when the component(s) is worn, damaged, or missing based on the monitored status of the component(s) at the inspection point. When the computing system has determined that the component(s) is worn, damaged, or missing the computing system is configured to initiate a control action, such as notifying an operator and/or adjusting a ground speed of the agricultural implement.

Detecting a worn, damaged, or missing component(s) of an agricultural implement using a UAV with sensors mounted thereto to first monitor the operating condition of the agricultural implement and then using the computing system to move the UAV to an inspection point adjacent to the component(s) to monitor the status of the component(s) improves the operation of the agricultural implement or an associated fleet of agricultural implements. As mentioned above, during an agricultural operation (e.g., tillage operation), the agricultural implement components often become damaged. Furthermore, sensors mounted on the agricultural implement and/or the agricultural vehicle to monitor the components are prone to damage from dirt and other debris due to the sensor proximity to the field surface and thus affect inspection of the components. Using the UAV with sensors mounted thereto to inspect the components only after monitoring the operating condition of the agricultural implement limits the sensor proximity to the field surface. As such, the sensors are less prone to damage from dirt and other debris. Additionally, using a single UAV with sensors mounted thereto to detect a worn, damaged, or missing component(s) of multiple agricultural implements reduces fleet cost by allowing multiple implements to share the same UAV/sensors.

Referring now to the drawings, FIG. 1 illustrates a perspective view of one embodiment of an agricultural implement 12 and an associated agricultural vehicle 10 in accordance with aspects of the present subject matter. In general, the agricultural implement 12 is configured to be towed across a field by the agricultural vehicle 10 in a direction of travel (indicated by arrow 14). For example, in one embodiment, the agricultural implement 12 is configured as a tillage implement (e.g., a disk ripper) and the agricultural vehicle 10 is configured as an agricultural tractor. However, in other embodiments, the agricultural implement 12 may be configured as any other suitable agricultural implement, such as another type of tillage implement, a seeder, planter, nutrient applicator, etc. Similarly, the agricultural vehicle 10 may be configured as any other suitable agricultural vehicle, such as an agricultural harvester, a self-propelled sprayer, etc.

As shown, the agricultural vehicle 10 includes a pair of front track assemblies 16, a pair of rear track assemblies 18, and a frame or chassis 20 coupled to and supported by the track assemblies 16, 18. However, in other embodiments, the agricultural vehicle 10 may include any other type of traction devices, such as wheels or tires. An operator's cab 22 may be supported by a portion of the chassis 20 and may house various input devices (e.g., a user interface) for permitting an operator to control the operation of one or more components of the agricultural vehicle 10 and/or one or more components of the agricultural implement 12. Furthermore, the agricultural vehicle 10 includes an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, the agricultural implement 12 includes a frame 28 configured to be towed by the agricultural vehicle 10 via a pull hitch or tow bar 30 in the direction of travel 14. In general, the frame 28 may include a plurality of frame members 44, such as beams, bars, and/or the like, configured to support or couple to a plurality of components. For example, the frame members 44 of the frame 28 may be configured to support a plurality of ground-engaging and/or ground-penetrating tools, such as a plurality of shank assemblies, disk blade assemblies (e.g., leveling blade assemblies), basket assemblies, tines, spikes, and/or the like. In one embodiment, the various ground-engaging and/or ground-penetrating tools may be configured to perform a tillage operation or any other suitable ground-engaging operation on the field across which the agricultural implement 12 is being towed. For example, in the illustrated embodiment, the frame 28 is configured to support various disk blade assemblies 46, such as leveling blade assemblies. The frame 28 is also configured to support a plurality of shank assemblies 50 and a plurality of crumbler wheels or basket assemblies 54. However, in alternative embodiments, the frame 28 may be configured to support any other suitable ground-engaging tool(s), ground-penetrating tool(s), or combinations of such tools.

Furthermore, the agricultural vehicle 10 or the agricultural implement 12 may include a location sensor 202. In general, the location sensor 202 may be configured to determine the current location of the agricultural vehicle/ implement 10/12 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 202 may be transmitted to a computing system and stored within the computing system's memory for subsequent use in identifying the location of the agricultural vehicle/implement 10/12. For example, the determined location of the agricultural vehicle/implement 10/12 may be used to facilitate aerial inspections of the agricultural implement 12 with an unmanned aerial vehicle (UAV).

Additionally, as will be described below, a UAV 100 may be moved to, and/or maintained at, one or more flight positions relative to the agricultural implement 12. In general, the flight positions are adjacent to one or more components (e.g., ground-engaging tool(s)) of the agricultural implement 12 or other areas adjacent to the agricultural implement 12. For example, one or more of the flight positions may allow the UAV 100 to monitor the entire agricultural implement 12 at once. As will be described below, the flight position(s) may allow the UAV 100 to monitor one or more operating conditions (e.g., plugged condition(s)) of the agricultural implement 12, for example, with a computing system, based on data generated by an operating condition sensor 56 (FIG. 2) mounted on the UAV 100 indicative of the operating condition(s) of the agricultural implement 12. Thereafter, the monitored operating condition(s) of the agricultural implement 12 is used to identify, for example, with the computing system, an inspection point(s) on the agricultural implement 12 to which the UAV 100 may be moved to inspect the component(s) at the inspection point(s).

Additionally, each flight position that is adjacent to the component(s) of the agricultural implement 12 may correspond to the inspection point(s) on the agricultural implement 12. In this respect, when the UAV 100 is maintained at the flight position(s) corresponding to the inspection point(s), the UAV 100 may inspect the component(s) during agricultural operations (e.g., tilling a field surface) such that a status of the component(s) (e.g., wear, damage, or absence) may be determined, for example, by the computing system. As will be described below, data indicative of the status of the component(s) of the agricultural implement 12 may be generated by a component status sensor 58 (FIG. 2), mounted on the UAV 100.

The flight positions of the UAV 100 relative to the agricultural implement 12 may include any suitable flight positions. For example, in several embodiments, the flight positions allow the UAV 100 to monitor the operating condition(s) of the agricultural implement 12. Additionally, the flight positions allow the UAV 100 to be adjacent to the inspection point(s) such that the UAV 100 can monitor the status of the component(s) of the agricultural implement 12, such as the disk blade assemblies 46, the shank assemblies 50, and/or the basket assemblies 54. However, in alternative embodiments, the flight positions of the UAV 100 may include any other suitable flight positions in addition to or in lieu of any of the aforementioned flight positions.

As shown in FIG. 1, the UAV 100 may be configured to fly along a flight path (e.g., as indicated by dashed line 34) to monitor the operating condition(s) of the agricultural implement 12 and inspect the component(s). In general, the flight path 34 corresponds to a flight path along which the UAV 100 flies such that the UAV 100 moves between one or more of the flight positions relative to the agricultural implement 12 to allow the UAV 100 to monitor the operating condition(s) of the agricultural implement 12 and to inspect the component(s) at the inspection point(s). For example, in the illustrated embodiment, the flight path 34 extends from a first flight position 36, at which the UAV 100 is locked onto the agricultural implement 12 for monitoring the operating condition(s) of the agricultural implement 12, to a second flight position 38, at which the UAV 100 can inspect the disk blade assemblies 46 of the agricultural implement 12 adjacent to the second flight position 38 at the corresponding inspection point. As will be described below, the first flight position 36 where the UAV 100 locks onto the agricultural implement 12 may correspond to a flight position that is within a predetermined distance of the agricultural implement 12 at which the UAV 100 begins the flight path 34 and which is maintained while the UAV 100 is monitoring (e.g., with a sensor) the operating condition(s) of the agricultural implement 12. Moreover, when at the second flight position 38, the UAV 100 is positioned such that the UAV 100 may inspect (e.g., with a sensor) the component(s) of the agricultural implement 12. However, in alternative embodiments, the flight path 34 may move the UAV 100 to any other positions relative to the agricultural implement 12 to allow the UAV 100 to monitor the operating condition(s) of the agricultural implement 12 and/or inspect the disk blade assemblies 46 and/or other component(s) of the agricultural implement 12.

It should be appreciated that the configuration of the agricultural vehicle 10 and agricultural implement 12 described above and shown in FIG. 1 is provided only to place the present subject matter in an exemplary field of use. Thus, it should be apparent that the present subject matter may be readily adaptable to any manner of agricultural vehicle and/or implement configuration.

Figure 2:
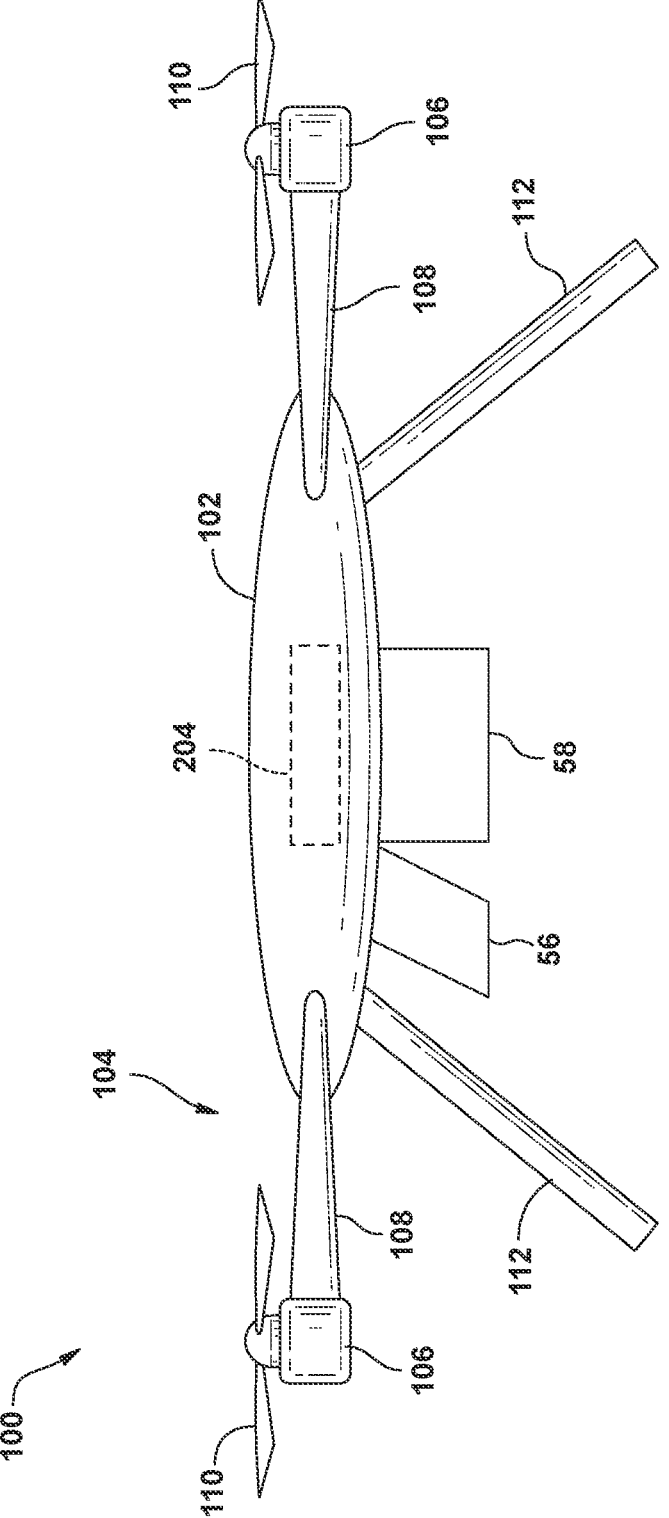
FIG. 2 illustrates a front view of one embodiment of an unmanned aerial vehicle (UAV) in accordance with aspects of the present subject matter.

Referring now to FIG. 2, a front view of one embodiment of an unmanned aerial vehicle (UAV) 100 is illustrated in accordance with aspects of the present subject matter. The UAV 100 is configured to take off (e.g., from a landing pad) from its current or home position. The current or home position may correspond to a landing pad in which the UAV 100 may rest to conserve power and/or charge batteries. The current or home position may be located on an agricultural implement (e.g., agricultural implement 12) or an associated agricultural vehicle (e.g., agricultural vehicle 10). Alternatively, the current or home position may be located at a field house or other location away from the agricultural implement 12 and the agricultural vehicle 10 such that the UAV 100 is configured to take off and fly to the agricultural implement 12, such as to a field. Once within a predetermined distance of the agricultural implement 12 (e.g., such that the UAV 100 is locked onto to the agricultural implement 12), the UAV 100, flies along a flight path (e.g., the flight path 34 shown in FIG. 1) to monitor the operating condition(s) and inspect the component(s) of the agricultural implement 12. Afterward, the UAV 100 may fly to another agricultural implement and fly along a flight path to monitor the operating condition(s) and inspect the component(s) of that agricultural implement and so on. Thereafter, the UAV 100 may return to its home position. As such, the UAV 100 may generally correspond to any suitable aerial vehicle capable of unmanned flight, such as any UAV capable of controlled vertical, or nearly vertical, takeoffs and landings. For example, in the illustrated embodiment, the UAV 100 is configured as a quadcopter. However, in alternative embodiments, the UAV 100 may be configured as any other multi-rotor aerial vehicle, such as a tricopter, hexacopter, or octocopter. In further embodiments, the UAV 100 may be configured as a single-rotor helicopter or a fixed wing, hybrid vertical takeoff and landing aircraft.

As shown in FIG. 2, the UAV 100 may include various components that permit the UAV 100 to take off and fly relative to one or more agricultural implements. Specifically, in several embodiments, the UAV 100 may include a body or frame 102 that supports a propulsion system 104. For example, in one embodiment, the propulsion system 104 may include four motors 106 (two are shown in FIG. 2), with each motor 106 coupled to the body 102 via a support arm 108. Each motor 106 may, in turn, be configured to rotationally drive an associated propeller 110. Additionally, the UAV 100 may include a plurality of legs 112 configured to support the body 102 relative to a surface, such as when the UAV 100 is at landed position. However, in alternative embodiments, the propulsion system 104 may have any other suitable configuration. For example, the propulsion system 104 may include fewer or more than four motors 106 and associated propellers 110.

Moreover, in several embodiments, the UAV 100 may include a location sensor 204 positioned therein. In general, the location sensor 204 may be configured to determine the current location of the UAV 100 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 204 may be transmitted to a computing system (e.g., in the form of coordinates) and stored within the computing system's memory for subsequent processing and/or analysis. For instance, the determined location of the UAV 100 may be used to guide the UAV to the agricultural implement(s) from its home or current position and then relative to the agricultural implement(s) as the UAV 100 flies along the flight path(s). Additionally, or alternatively, a guiding sensor different from location sensor 204 and mounted on the UAV 100 may be utilized to guide the UAV 100 relative to the agricultural implement(s) as the UAV 100 flies along the flight path. For example, the guiding sensor may be utilized to guide the UAV 100 relative to the agricultural implement(s) as the UAV 100 flies along the flight path during loss of satellite signal of the location sensor 204. The guiding sensor may correspond to the operating condition sensor 56 or any other suitable sensor mounted on the UAV 100.

Furthermore, as shown in FIG. 2, the UAV 100 includes the operating condition sensor 56 mounted or otherwise supported on the UAV 100. In general, the operating condition sensor 56 may be configured to generate data indicative of the operating condition(s) of the agricultural implement(s) (e.g., the agricultural implement(s) 12) as the UAV 100 flies relative to the agricultural implement(s) along a flight path (e.g., the flight path 34). For example, the operating condition sensor 56 may be configured to generate data indicative of a plugged condition of one or more ground-engaging tools, such as a plugged condition of one or more of the disk blade assemblies 46 of the agricultural implement(s) 12, as the UAV 100 flies relative to the agricultural implement(s) 12 at the first flight position 36 of the flight path 34.

Additionally, as shown in FIG. 2, the UAV 100 includes a component status sensor 58 mounted or otherwise supported on the UAV 100. In general, the component status sensor 58 may be configured to generate data indicative of the status of the component(s) of the agricultural implement(s) (e.g., the agricultural implement(s) 12) as the UAV 100 flies relative to the agricultural implement(s) along a flight path (e.g., the flight path 34). For example, the component status sensor 58 may be configured to generate data indicative of the status (e.g., wear, damage, and/or absence) of one or more ground-engaging tools, such as one or more of the disk blade assemblies 46 of the agricultural implement(s) 12, as the UAV 100 flies relative to the agricultural implement(s) 12 at the second flight position 38 of the flight path 34. As will be described below, a computing system may be configured to monitor the data received from the operating condition sensor 56 and identify an inspection point on the agricultural implement(s) and control the UAV 100 to move and maintain a flight position adjacent to the inspection point such that the component status sensor 58 of the UAV may monitor the data indicative of the status of the component(s) at the inspection point. Based on the component status sensor 58 data, the computing system may determine that the component(s) are worn, damaged, or missing.

Additionally, in several embodiments, the operating condition sensor 56 may be configured as a first acoustic sensor configured to receive sound emitted from the agricultural implement(s) 12 indicative of the operating condition of the agricultural implement(s) 12. For example, the operating condition sensor 56 may be configured as any suitable directional microphone, such as a stereo directional microphone, an omnidirectional microphone, and/or the like. However, in alternative embodiments, the operating condition sensor 56 may correspond to any other suitable type of acoustic sensor. As such, the operating condition sensor 56 may generate data indicative of the operating condition(s) of the agricultural implement(s) 12 based on the received sound. Moreover, the data generated by the operating condition sensor 56 may include data corresponding to a direction of the sound(s) generated by the agricultural implement(s) 12, which may be used to identify the inspection point on the agricultural implement(s) 12 and/or a specific component of the agricultural implement(s) 12 which is generating the sound(s). Additionally, the data generated by the operating condition sensor 56 may include data corresponding to the amplitude, frequency, pitch, and/or intensity of the sounds, which may be used, for example, by the computing system, to determine the operating condition(s), such as whether the ground-engaging tool(s) of the agricultural implement 12 are plugged and the severity of the plugging.

Likewise, in several embodiments, the component status sensor 58 may be configured as a second acoustic sensor configured to receive sound emitted from the component(s) of the agricultural implement(s) 12 indicative of the status of the component(s). For example, the component status sensor 58 may be configured as any suitable directional microphone, such as a stereo directional microphone, an omnidirectional microphone, and/or the like. However, in alternative embodiments, the component status sensor 58 may correspond to any other suitable type of acoustic sensor. As such, the component status sensor 58 may generate data indicative of the status of the component(s) based on the received sound. Additionally, the data generated by the component status sensor 58 may include data corresponding to the amplitude, frequency, pitch, and/or intensity of the sounds, which may be used, for example, by the computing system, to determine whether the component(s) at the inspection point is worn, damaged, or missing. For example, when the component(s) at the inspection point is worn, damaged, or missing, the data generated by the component status sensor 58 may correspond to amplitude, frequency, pitch, and/or intensity of the sounds from undesired vibrations produced as a result of worn, damaged, or missing components.

Alternatively, the operating condition sensor 56 may be configured as a vision-based sensor, such as an imaging device. For example, the imaging device may correspond to a stereographic camera configured to capture three-dimensional images of the agricultural implement(s) 12. In other embodiments, the imaging device may correspond to a monocular camera configured to capture two-dimensional images of the agricultural implement(s) 12. However, in alternative embodiments, the imaging device may correspond to any other suitable sensing device configured to capture images or image-like data, such as a LIDAR sensor or a RADAR sensor.

Furthermore, the component status sensor 58 may be configured as a vision-based sensor, such as an imaging device. For example, the imaging device may correspond to a stereographic camera configured to capture three-dimensional images of the component(s) at the corresponding inspection point. In other embodiments, the imaging device may correspond to a monocular camera configured to capture two-dimensional images of the component(s) at the corresponding inspection point. However, in alternative embodiments, the imaging device may correspond to any other suitable sensing device configured to capture images or image-like data, such as a LIDAR sensor or a RADAR sensor.

It should be appreciated that the UAV 100 may include any suitable number of sensors configured to monitor the operating condition(s) and/or the status of the component(s) of the agricultural implement(s) 12 or any other suitable kind of agricultural implement(s). For example, the UAV 100 may include a single sensor, such as a single sensor configured as an acoustic sensor, for monitoring the operating condition(s) and for monitoring the status of the component(s) of any suitable agricultural implement. Additionally, the operating condition and component status sensors 56, 58 described above may be configured as any other suitable kind of sensor configured to monitor the operating condition(s) and the status of the component(s) of the agricultural implement(s) 12 or any other suitable kind of agricultural implement(s).

Furthermore, the operating condition and component status sensors 56, 58 may be installed at any suitable location(s) on the UAV 100 that allow the operating condition and component status sensors 56, 58, respectively, to monitor the operating condition(s) and the status of the component(s) of the agricultural implement(s) 12 or any other suitable kind of agricultural implement(s). For example, in some embodiments, the operating condition sensor 56 and/or the component status sensor 58 may be mounted on the underside of the body 102 of the UAV 100. However, in alternative embodiments, the operating condition sensor 56 and/or the component status sensor 58 may be installed at any other suitable location(s) on the UAV 100 or on any other suitable kind of UAV tethered to the agricultural implement 10 or any other suitable kind of agricultural implement.

It should be further appreciated that the configuration of the UAV 100 described above and shown in FIG. 2 is provided only to place the present subject matter in an exemplary field of use. Thus, it should be appreciated that the present subject matter may be readily adaptable to any manner of UAV configuration.

Figure 3:
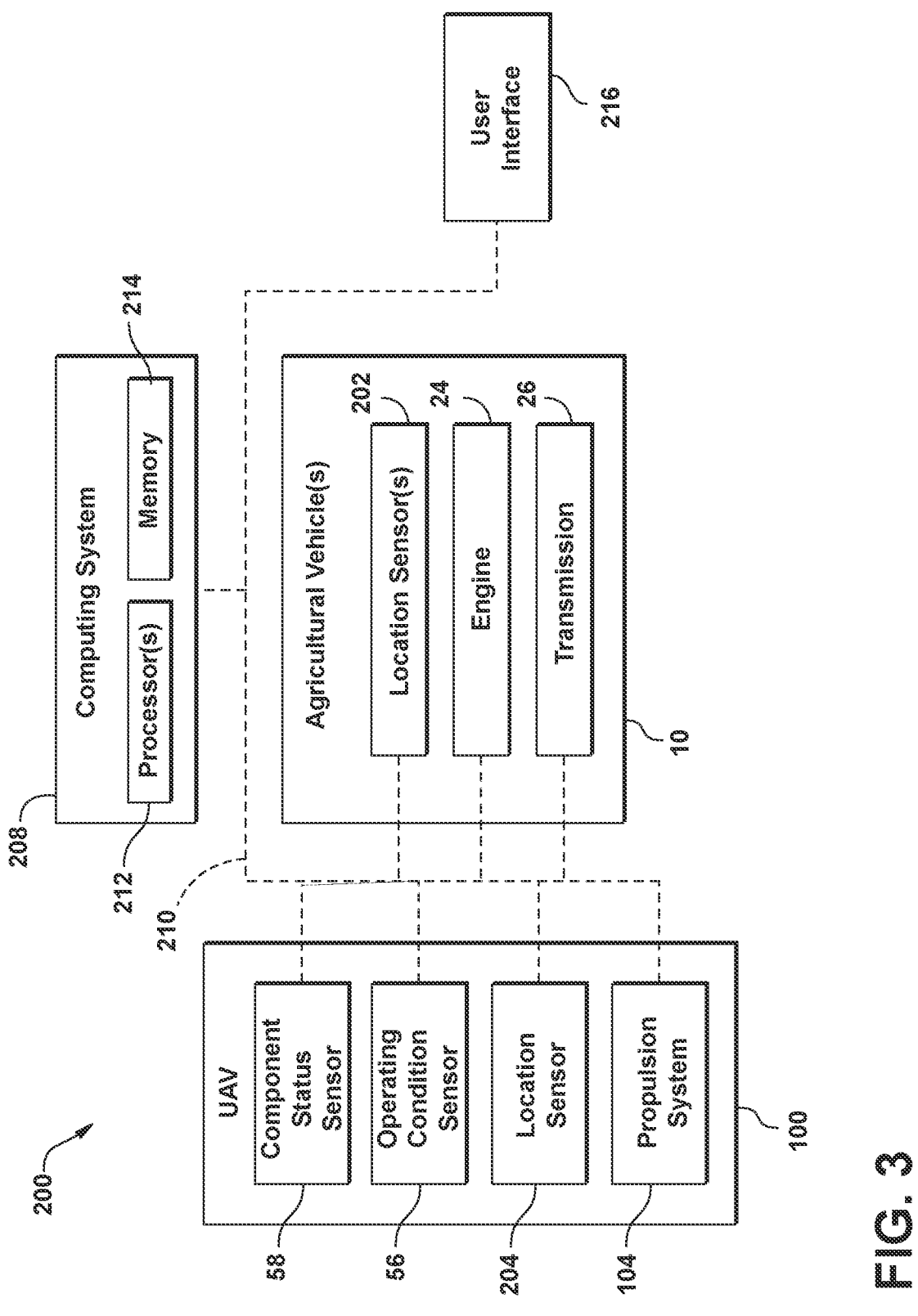
FIG. 3 illustrates a schematic view of one embodiment of a system for detecting worn, damaged, or missing agricultural implement components in accordance with aspects of the present subject matter.

Referring now to FIG. 3, a schematic view of one embodiment of a system 200 for detecting worn, damaged, or missing agricultural implement components is illustrated in accordance with aspects of the present subject matter. In general, the system 200 will be described herein with reference to the agricultural implement 12 and the UAV 100 described above with reference to FIGS. 1 and 2. However, it should be appreciated by those of ordinary skill in the art that the disclosed system 200 may generally be utilized with agricultural implements having any other suitable implement configuration and UAVs having any other suitable UAV configuration.

As shown in FIG. 3, the system 200 includes the components of the UAV 100, such as the propulsion system 104, the location sensor 202, the location sensor 204, the operating condition sensor 56, and the component status sensor 58.

Additionally, the system 200 includes a computing system 208 communicatively coupled to one or more components of the agricultural implement(s) 12, agricultural vehicle(s) 10, and/or the UAV 100 to allow the operation of such components to be electronically or automatically controlled by the computing system 208. For example, the computing system 208 may be communicatively coupled to the operating condition sensor 56 and the component status sensor 58 of the UAV 100 via a communicative link 210. As such, the computing system 208 may be configured to receive data from the operating condition sensor 56 indicative of the operating condition of the agricultural implement(s) 12. Likewise, the computing system 208 may be configured to receive data from the component status sensor 58 indicative of the status of the component(s), such as the disk blade assemblies 46, on the agricultural implement(s) 12. Moreover, the computing system 208 may be communicatively coupled to the location sensor(s) 202 of the agricultural vehicle(s)/implement(s) 10/12 and/or the location sensor 204 of the UAV 100 via the communicative link 210. Thus, the computing system 208 may be configured to receive location data from the location sensors 202, 204 that is indicative of the locations of the agricultural vehicle(s)/implement(s) 10/12 and/or the UAV 100. Furthermore, the computing system 208 may be communicatively coupled to the engine 24 and/or the transmission 26 of the agricultural vehicle(s) 10 and/or the propulsion system 104 of the UAV 100 via the communicative link 210. In this respect, the computing system 208 may be configured to control the operation of the engine 24 and/or transmission 26 of the agricultural vehicle(s) 10, for example, to adjust the ground speed of the agricultural implement(s) 12. Moreover, the computing system 208 may be configured to control the operation of the propulsion system 104 of the UAV 100, for example, to move the UAV 100 from one flight position to another flight position. In addition, the computing system 208 may be communicatively coupled to any other suitable components of the agricultural vehicle(s)/implement(s) 10/12 and/or the UAV 100.

In general, the computing system 208 may comprise any suitable processor-based device known in the art, such as a given controller or computing device or any suitable combination of controllers or computing devices. Thus, in several embodiments, the computing system 208 may include one or more processor(s) 212 and associated memory device (s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 208 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 208 to perform various computer-implemented functions, such as one or more aspects of the methods and algorithms that will be described herein. In addition, the computing system 208 may also include various other suitable components, such as a communications circuit or module, one or more input/output channels, a data/control bus and/or the like.

It should be appreciated that the computing system 208 may correspond to an existing computing system(s) of the agricultural implement 12, the agricultural vehicle 10, and/ or the UAV 100, itself, or the computing system 208 may correspond to a separate processing device. For instance, in one embodiment, the computing system 208 may form all or part of a separate plug-in module that may be installed in association with the agricultural implement 12 and/or the agricultural vehicle 10 to allow for the disclosed systems to be implemented without requiring additional software to be uploaded onto existing control devices of the agricultural implement 12 and/or the agricultural vehicle 10. It should also be appreciated that the various functions of the computing system 208 may be performed by a single processor-based device or may be distributed across any number of processor-based devices, in which instance such devices may be considered to form part of the computing system 208. For instance, the functions of the computing system 208 may be distributed across multiple application-specific controllers or computing devices, such as a UAV-based controller, an agricultural vehicle-based controller(s) (e.g., an engine controller), an agricultural site-based computing device(s) (e.g., a server in an agricultural field house/office, a remote or offsite computing device(s) (e.g., a computing device(s) in a server farm), and/or the like.

In some embodiments, the system 200 may also include a user interface 216. More specifically, the user interface 216 may be configured to provide feedback from the computing system 208 (e.g., notifications associated with status, such as wear, damage, or absence, of the component(s) of the agricultural implement(s) 12). As such, the user interface 216 may include one or more feedback devices (not shown), such as display screens, speakers, warning lights, and/or the like, that are configured to provide feedback from the computing system 208. In this respect, the user interface 216 may be communicatively coupled to the computing system 208 via the communicative link 210 to permit the received feedback to be transmitted from the computing system 208 to the user interface 216. In one embodiment, the user interface 216 may be positioned within an agricultural field house or office. However, in alternative embodiments, the user interface 216 may positioned/mounted at any other suitable location.

Referring now to FIG. 4, a flow diagram of one embodiment of example control logic 300 that may be executed by the computing system 208 (or any other suitable computing system) for detecting worn, damaged, or missing agricultural implement components is illustrated in accordance with aspects of the present subject matter. Specifically, the control logic 300 shown in FIG. 4 is representative of steps of one embodiment of an algorithm that can be executed to detect worn, damaged, or missing agricultural implement components without the need for the operator(s) to perform visual inspection of the agricultural implement(s). Moreover, when it is determined that the component(s) of an agricultural implement(s) is worn, damaged, or missing, the control logic 300 can be executed to initiate one or more control actions that reduce the amount of time the operator is not performing an agricultural operation. Thus, in several embodiments, the control logic 300 may be advantageously utilized in association with a system installed on or forming part of an agricultural implement(s) or a UAV to allow for real-time detecting of worn, damaged, or missing agricultural implement components without requiring substantial computing resources and/or processing time. However, in other embodiments, the control logic 300 may be used in association with any other suitable system, application, and/or the like for detecting worn, damaged, or missing agricultural implement components.

As shown in FIG. 4, at (302), the control logic 300 includes controlling the propulsion system of the UAV to maintain the UAV at a first flight position relative to the agricultural implement. Specifically, as mentioned above, the computing system 208 may be communicatively coupled to the propulsion system 104 via the communicative link 210. As such, the computing system 208 may control the propulsion system 104 of the UAV 100 to maintain the UAV 100 at a first flight position 36 relative to the agricultural implement 12.

For example, in some embodiments, the computing system 208 may control the propulsion system 104 of the UAV 100 to maintain the UAV 100 at a first flight position 36 relative to the agricultural implement 12 based on received data from location sensors 202, 204. As mentioned previously, in several embodiments, the UAV 100 includes the location sensor 204 configured to capture data indicative of the location of the UAV 100, and the agricultural implement 12 includes the location sensor 202 configured to capture data indicative of the location of the corresponding agricultural implement 12. Also mentioned previously, the computing system 208 is communicatively coupled to the location sensors 202, 204 via the communicative link 210. As such, the computing system 208 may receive data (e.g., coordinates) indicative of the location of the agricultural implement 12 from the location sensor 202 and/or data indicative of the location of the UAV 100 from the location sensor 204. As such, the first flight position 36 of the UAV 100 may be located at a predetermined position (e.g., to allow the UAV 100 to monitor the operating condition(s) of the agricultural implement 12) relative to the agricultural implement 12. Additionally, the computing system 208 may be configured to control the propulsion system 104 of the UAV 100 to maintain the UAV 100 at the predetermined position when the received data from the location sensors 202, 204 indicates that the UAV 100 is at the predetermined position.

Furthermore, at (304), the control logic 300 includes receiving data generated by an operating condition sensor supported on the UAV indicative of the operating condition of the agricultural implement. Specifically, as mentioned above, in several embodiments, the computing system 208 may be communicatively coupled to the operating condition sensor 56 supported on the UAV 100 via the communicative link 210. As such, the computing system 208 may receive data from the operating condition sensor 56, which is indicative of the operating condition(s) of the agricultural implement 12.

Additionally, at (306), the control logic 300 includes monitoring the operating condition of the agricultural implement based on the data received from the operating condition sensor. In this respect, the computing system 208 is configured to monitor the operating condition(s) of the agricultural implement 12 based on the data received from the operating condition sensor 56 mounted on the UAV 100. For example, the computing system 208 may be configured to monitor one or more plugged ground-engaging tools (e.g., disk blade assembly(ies) 46) of the agricultural implement 12 based on the data received from the operating condition sensor 56 indicative of plugged ground-engaging tool(s), such as a plugged disk blade assembly(ies) 46.

Moreover, as shown in FIG. 4, at (308), the control logic 300 includes identifying an inspection point on the agricultural implement based on the monitored operating condition of the agricultural implement. Specifically, in several embodiments, the computing system 208 is configured to identify an inspection point on the agricultural implement 12 based on the monitored operating condition. For example, the computing system 208 may be configured to identify an inspection point adjacent to one or more plugged ground-engaging tools (e.g., disk blade assembly(ies) 46).

Additionally, as mentioned previously, in several embodiments, the operating condition sensor 56 may be configured as an acoustic sensor. As such, the computing system 208 may be configured to compare the generated data from the acoustic sensor indicative of the operating condition(s) of the agricultural implement 12 (e.g., amplitude) to an acoustic parameter threshold indicative of an undesired operating condition (e.g., minimum amplitude indicative of plugging of ground-engaging tool(s)) of the agricultural implement 12. Thereafter, the computing system 208 may be configured to identify (e.g., locate) the inspection point on the agricultural implement 12 based on the data generated by the acoustic sensor when the generated data exceeds the acoustic parameter threshold (e.g., amplitude exceeds minimum amplitude indicative of plugging).

Furthermore, as shown in FIG. 4, at (310), the control logic 300 includes controlling the propulsion system of the UAV to move the UAV from the first flight position to a second flight position adjacent to the inspection point and maintain the UAV at the second flight position. Specifically, the computing system 208 may control the propulsion system 104 of the UAV 100 to move the UAV 100 from the first flight position 36 to the second flight position 38 and maintain the UAV 100 at the second flight position 38. The inspection point is adjacent to the second flight position 38 to which the UAV 100 may be moved such that the UAV 100 may inspect (e.g., monitor with one or more component status sensors 58) the plugged component(s) (e.g., disk blade assembly(ies) 46) of the agricultural implement 12 at the inspection point.

Additionally, as shown in FIG. 4, at (312), the control logic 300 includes receiving data generated by a component status sensor supported on the UAV indicative of the status of at least one component of the agricultural implement at the inspection point. Specifically, as mentioned above, in several embodiments, the computing system 208 may be communicatively coupled to the component status sensor 58 supported on the UAV 100 via the communicative link 210. As such, the computing system 208 may receive data from the component status sensor 58, which is indicative of the status, such as wear, damage, or absence of at least one component (e.g., ground-engaging tool) of the agricultural implement 12 at the inspection point.

Moreover, as shown in FIG. 4, at (314), the control logic 300 includes monitoring the status of the at least one component of the agricultural implement at the inspection point based on the data generated by the component status sensor. In this respect, the computing system 208 is configured to monitor the status of at least one component (e.g., ground-engaging tool) of the agricultural implement 12 based on the data received from the component status sensor 58 of the UAV 100. For example, as mentioned previously, the component status sensor 58 may be configured as a vision-based sensor, such as an imaging device configured to capture images of the component(s) at the corresponding inspection point. As such, the component status sensor 58 may be configured to capture images of a worn, damaged, or missing component(s), such as a worn, damaged, or missing ground-engaging tool(s) at the inspection point. Thus, the computing system 208 may be configured to monitor the damage to a plugged ground-engaging tool(s) (e.g., plugged disk blade assembly(ies) 46) from the captured images.

Additionally, as shown in FIG. 4, at (316), the control logic 300 includes determining when the at least one component of the agricultural implement is worn, damaged, or missing based on the monitored status of the at least one component at the inspection point. Specifically, the computing system 208 may be configured to determine that one or more of the ground-engaging tools (e.g., disk blade assembly(ies) 46) of the agricultural implement 12 are worn, damaged, or missing based on the monitored data. For example, the computing system 208 may be configured to determine that the ground-engaging tool(s) (e.g., disk blade assembly(ies) 46) of the agricultural implement 12 are worn, damaged, or missing from the monitored captured images mentioned previously. The control logic 300 proceeds to (318) when determined that at least one component of the agricultural implement is worn, damaged, or missing. Otherwise, the control logic 300 returns to (302).

Furthermore, as shown in FIG. 4, at (318), the control logic 300 includes initiating a control action when the at least one component of the agricultural implement is worn, damaged, or missing. Specifically, as mentioned above, the computing system 208 is communicatively coupled to the user interface 216, the engine 24 of the agricultural vehicle 10 towing the agricultural implement 12, and the transmission 26 of the agricultural vehicle 10 towing the agricultural implement 12. As such, the computing system 208 may be configured to notify the operator of the agricultural implement 12, for example, via the user interface 216, when determined at (316) that the at least one component of the agricultural implement 12 is worn, damaged, or missing. Additionally, the computing system 208 may be configured to adjust the ground speed of the agricultural implement 12 when determined at (316) that the at least one component of the agricultural implement 12 is worn, damaged, or missing for example, by controlling an operation of the engine 24 and/or the transmission 26 of the agricultural vehicle 10 towing the agricultural implement 12. Then, the control logic 300 returns to (302).

Referring now to FIG. 5, a flow diagram of one embodiment of a method 400 for detecting worn, damaged, or missing agricultural implement components is illustrated in accordance with aspects of the present subject matter. In general, the method 400 will be described herein with reference to the agricultural vehicle 10, the agricultural implement 12, the UAV 100, the system 200, and the control logic 300 described above with reference to FIGS. 1-4. However, it should be appreciated by those of ordinary skill in the art that the disclosed method 400 may generally be implemented with any agricultural vehicle having any suitable vehicle configuration, with any agricultural implement having any suitable implement configuration, with any UAV having any suitable UAV configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 may include controlling, with a computing system, a propulsion system of an unmanned aerial vehicle (UAV) to maintain the UAV at a first flight position relative to the agricultural implement. For example, as described above, the computing system 208 may be configured to control the propulsion system 104 of the UAV 100 to maintain the UAV 100 at a first flight position 36 relative to the agricultural implement 12.

Moreover, as shown in FIG. 5, at (404), the method 400 may include receiving, with the computing system, data from a component status sensor supported on the UAV indicative of a status of at least one component of the agricultural implement. For example, as described above, the computing system 208 may be configured to receive data from the component status sensor 58 (e.g., via the communicative link 210) supported on the UAV 100 indicative of the status of at least one component (e.g., ground-engaging tool) of the agricultural implement 12.

Additionally, as shown in FIG. 5, at (406), the method 400 may include monitoring, with the computing system, the status of the at least one component of the agricultural implement based on the received component status sensor data. For example, as described above, the computing system 208 may be configured to monitor the status of at least one component (e.g., ground-engaging tool) of the agricultural implement 12 based on the data received from the component status sensor 58.

Furthermore, as shown in FIG. 5, at (408), the method 400 may include determining, with the computing system, when the at least one component of the agricultural implement is worn, damaged, or missing based on the monitored status of the at least one component. For example, as described above, the computing system 208 may be configured to determine when at least one component (e.g., ground-engaging tool) of the agricultural implement 12 is worn, damaged, or missing based on the monitored status of at least one component (e.g., ground-engaging tool).

Moreover, as shown in FIG. 5, at (410), the method 400 may include initiating, with the computing system, a control action when it is determined that the at least one component of the agricultural implement is worn, damaged, or missing. For example, as described above, the computing system 208 may be configured to initiate a control action, such as adjusting the ground speed of the agricultural implement 12, when determined that at least one component (e.g., ground-engaging tool) of the agricultural implement 12 is worn, damaged, or missing.

It is to be understood that the steps of the control logic 300 and the method 400 are performed by the computing system 208 upon loading and executing software code or instructions which are tangibly stored on one or more tangible computer readable media, such as one or more magnetic media (e.g., a computer hard drive(s)), one or more optical media (e.g., an optical disc(s)), solid-state memory (e.g., flash memory), and/or other storage media known in the art. Thus, any of the functionality performed by the computing system 208 described herein, such as the control logic 300 and the method 400, is implemented in software code or instructions which are tangibly stored on one or more tangible computer readable media. The computing system 208 loads the software code or instructions via a direct interface with the one or more computer readable media or via a wired and/or wireless network. Upon loading and executing such software code or instructions by the computing system 208, the computing system 208 may perform any of the functionality of the computing system 208 described herein, including any steps of the control logic 300 and the method 400 described herein.

The term "software code" or "code" used herein refers to any instructions or set of instructions that influence the operation of a computing system, such as one or more computers or one or more controllers. They may exist in a computer-executable form, such as machine code, which is the set of instructions and data directly executed by a computing system's central processing unit(s) or by a controller(s), a human-understandable form, such as source code, which may be compiled in order to be executed by a computing system's central processing unit(s) or by a controller(s), or an intermediate form, such as object code, which is produced by a compiler. As used herein, the term "software code" or "code" also includes any human-understandable computer instructions or set of instructions (e.g., a script), that may be executed on the fly with the aid of an interpreter executed by a computing system's central processing unit(s) or by a controller(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for detecting worn, damaged, or missing agricultural implement components, the system comprising:
   an unmanned aerial vehicle (UAV) configured to fly relative to an agricultural implement, the UAV comprising:
   a propulsion system configured to provide propulsive power to the UAV;
   an operating condition sensor configured to generate data indicative of an operating condition of the agricultural implement; and a component status sensor mounted to the UAV and configured to generate data indicative of a status of at least one component of the agricultural implement; and a computing system communicatively coupled to the propulsion system, the operating condition sensor, and the component status sensor, the computing system being configured to:

control the propulsion system of the UAV to maintain the UAV at a first flight position relative to the agricultural implement;

monitor the operating condition of the agricultural implement based on the data generated by the operating condition sensor;

identify an inspection point on the agricultural implement based on the monitored operating condition of the agricultural implement;

control the propulsion system of the UAV to move the UAV from the first flight position to a second flight position adjacent to the inspection point and maintain the UAV at the second flight position;

monitor the status of the at least one component of the agricultural implement at the inspection point based on the data generated by the component status sensor; and determine when the at least one component of the agricultural implement is worn, damaged, or missing based on the monitored status of the at least one component at the inspection point.

2. The system of claim 1, further comprising:

a location sensor supported by the agricultural implement and configured to generate data indicative of a location of the agricultural implement within a field, wherein, the computing system is communicatively coupled to the location sensor, the computing system being further configured to:

monitor the location of the agricultural implement based on the data generated by the location sensor; and control the propulsion system of the UAV to maintain the UAV at the first flight position relative to the agricultural implement based on the monitored location of the agricultural implement.

3. The system of claim 1, wherein the operating condition sensor comprises one of an acoustic sensor or a vision-based sensor.

4. The system of claim 3, wherein:

the operating condition sensor comprises the acoustic sensor, wherein the acoustic sensor is configured to receive sound emitted from the agricultural implement indicative of the operating condition of the agricultural implement and generate data indicative of the operating condition of the agricultural implement based on the received sound; and wherein, the computing system is further configured to:

compare the data generated by the acoustic sensor to an acoustic parameter threshold indicative of an undesired operating condition of the agricultural implement; and identify the inspection point on the agricultural implement based on the data generated by the acoustic sensor when the generated data exceeds the acoustic parameter threshold.

5. The system of claim 1, wherein the computing system is further configured to initiate a control action when it is determined that the at least one component of the agricultural implement is worn, damaged, or missing.

6. The system of claim 5, wherein the control action comprises notifying an operator of the agricultural implement that the at least one component of the agricultural implement is worn, damaged, or missing.

7. The system of claim 5, wherein the control action comprises adjusting a ground speed of the agricultural implement.

8. A method for detecting worn, damaged, or missing agricultural implement components, the method comprising:

controlling, with a computing system, a propulsion system of an unmanned aerial vehicle (UAV) to maintain the UAV at a first flight position relative to an agricultural implement;

receiving, with the computing system, data from an operating condition sensor supported on the UAV indicative of an operating condition of the agricultural implement;

monitoring, with the computing system, the operating condition of the agricultural implement based on the received operating condition sensor data;

identifying, with the computing system, an inspection point on the agricultural implement based on the monitored operating condition of the agricultural implement;

controlling, with the computing system, the propulsion system of the UAV to move the UAV from the first flight position to a second flight position adjacent to the inspection point and maintain the UAV at the second flight position;

receiving, with the computing system, data from a component status sensor supported on the UAV indicative of a status of at least one component of the agricultural implement;

monitoring, with the computing system, the status of the at least one component of the agricultural implement at the inspection point based on the received component status sensor data;

determining, with the computing system, when the at least one component of the agricultural implement is worn, damaged, or missing based on the monitored status of the at least one component at the inspection point; and initiating, with the computing system, a control action when it is determined that the at least one component of the agricultural implement is worn, damaged, or missing.

9. The method of claim 8, further comprising:

receiving, with the computing system, data from a location sensor supported on the agricultural implement indicative of a location of the agricultural implement within a field;

monitoring, with the computing system, the location of the agricultural implement based on the received location sensor data; and controlling, with the computing system, the propulsion system of the UAV to maintain the UAV at the first flight position relative to the agricultural implement based on the monitored location of the agricultural implement.

10. The method of claim 8, wherein the operating condition sensor corresponds to an acoustic sensor, the method further comprising:

receiving, with the computing system, acoustic sensor data indicative of the operating condition of the agricultural implement;

comparing, with the computing system, the received acoustic sensor data to an acoustic parameter threshold indicative of an undesired operating condition of the agricultural implement; and identifying, with the computing system, the inspection point on the agricultural implement based on the received acoustic sensor data when the received acoustic sensor data exceeds the acoustic parameter threshold.

11. An unmanned aerial vehicle (UAV) comprising:

a frame;

a propulsion system supported by the frame and configured to provide propulsive power to the UAV;

an operating condition sensor configured to generate data indicative of an operating condition of the agricultural implement;

a component status sensor supported by the frame and configured to generate data indicative of a status of at least one component of an agricultural implement; and a computing system communicatively coupled to the propulsion system, the operating condition sensor, and the component status sensor, the computing system being configured to:

control the propulsion system of the UAV to maintain the UAV at a first flight position relative to the agricultural implement;

monitor the operating condition of the agricultural implement based on the data generated by the operating condition sensor;

identify an inspection point on the agricultural implement based on the monitored operating condition of the agricultural implement;

control the propulsion system of the UAV to move the UAV from the first flight position to a second flight position adjacent to the inspection point and maintain the UAV at the second flight position;

monitor the status of the at least one component of the agricultural implement at the inspection point based on the data generated by the component status sensor; and determine when the at least one component of the agricultural implement is worn, damaged, or missing based on the monitored status of the at least one component at the inspection point.

12. The UAV of claim 11, further comprising:

a location sensor supported by the agricultural implement and configured to generate data indicative of a location of the agricultural implement within a field, wherein, the computing system is communicatively coupled to the location sensor, the computing system being further configured to:

monitor the location of the agricultural implement based on the data generated by the location sensor; and control the propulsion system of the UAV to maintain the UAV at the first flight position relative to the agricultural implement based on the monitored location of the agricultural implement.

13. The UAV of claim 11, wherein the operating condition sensor comprises one of an acoustic sensor or a vision-based sensor.

14. The UAV of claim 13, wherein:

the operating condition sensor comprises the acoustic sensor, wherein the acoustic sensor is configured to receive sound emitted from the agricultural implement indicative of the operating condition of the agricultural implement and generate data indicative of the operating condition of the agricultural implement based on the received sound; and wherein, the computing system is further configured to:

compare the data generated by the acoustic sensor to an acoustic parameter threshold indicative of an undesired operating condition of the agricultural implement; and identify the inspection point on the agricultural implement based on the data generated by the acoustic sensor when the generated data exceeds the acoustic parameter threshold.

15. The UAV of claim 11, wherein the computing system is further configured to initiate a control action when it is determined that the at least one component of the agricultural implement is worn, damaged, or missing.

16. The UAV of claim 15, wherein the control action comprises notifying an operator of the agricultural implement that the at least one component of the agricultural implement is worn, damaged, or missing.

17. The UAV of claim 15, wherein the control action comprises adjusting a ground speed of the agricultural implement.

* * * * *